United States Patent
Stephens et al.

(10) Patent No.: US 12,148,094 B2
(45) Date of Patent: Nov. 19, 2024

(54) AUTOMATED UPDATING AND DISTRIBUTION OF DIGITAL RECONNAISSANCE MAPS OF AN INCIDENT SCENE

(71) Applicant: MOTOROLA SOLUTIONS, INC., Chicago, IL (US)

(72) Inventors: Elizabeth M. Stephens, Pembroke Pine, FL (US); Antonio Faraone, Fort Lauderdale, FL (US); Anbuselvan Kuppusamy, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 80 days.

(21) Appl. No.: 17/808,020

(22) Filed: Jun. 21, 2022

(65) Prior Publication Data
US 2023/0410421 A1 Dec. 21, 2023

(51) Int. Cl.
| | |
|---|---|
| G06T 17/05 | (2011.01) |
| G06Q 50/26 | (2024.01) |
| G06V 20/40 | (2022.01) |
| G10L 15/08 | (2006.01) |

(52) U.S. Cl.
CPC .......... G06T 17/05 (2013.01); G06Q 50/265 (2013.01); G06V 20/41 (2022.01); G10L 15/08 (2013.01); G10L 2015/088 (2013.01)

(58) Field of Classification Search
CPC ...... G06T 17/05; G06V 20/41; G06Q 50/265; G10L 15/08; G10L 2015/088
See application file for complete search history.

(56) References Cited

U.S. PATENT DOCUMENTS

| | | | |
|---|---|---|---|
| 8,941,677 B1 * | 1/2015 | Hallenbeck | H04W 4/02 345/55 |
| 9,159,210 B2 | 10/2015 | Jones, Jr. et al. | |
| 9,691,245 B2 * | 6/2017 | Jones, Jr. | G08B 19/005 |

(Continued)

FOREIGN PATENT DOCUMENTS

| | | | | |
|---|---|---|---|---|
| CN | 114493930 A | * | 5/2022 | |
| JP | 2004320442 A | * | 11/2004 | |
| WO | WO-2009105603 A1 | * | 8/2009 | G08B 25/14 |

Primary Examiner — Xin Sheng
(74) Attorney, Agent, or Firm — Michael Best & Friedrich LLP

(57) ABSTRACT

Systems and methods for dynamically updating and distributing digital reconnaissance maps for incident response. One example system includes an electronic processor coupled to an electronic communication interface. The processor is configured to receive an incident notification for an incident occurring at an incident scene and to generate a reconnaissance map for the incident scene. The processor is configured to receive a voice communication associated with a first incident responder at the incident scene and determine, for the first incident responder, a location within the incident scene. The processor is configured to determine a location status for the location based on the voice communication and to generate an updated reconnaissance map for the incident scene based on the reconnaissance map, the location, and the location status. The processor is configured to send, via the communication interface, the updated reconnaissance map to an electronic communication device associated with a second incident responder.

19 Claims, 6 Drawing Sheets

(56) References Cited

U.S. PATENT DOCUMENTS

| | | |
|---|---|---|
| 10,127,705 B2 | 11/2018 | Lim et al. |
| 10,217,287 B2 | 2/2019 | Lim et al. |
| 10,586,109 B1 | 3/2020 | Fowler et al. |
| 10,715,967 B1 | 7/2020 | Gan et al. |
| 11,151,494 B2 | 10/2021 | Singhal et al. |
| 2018/0003513 A1 | 1/2018 | Guzik et al. |
| 2020/0349350 A1* | 11/2020 | Toh .................. G06F 3/0346 |
| 2020/0402192 A1 | 12/2020 | Dahm et al. |
| 2021/0043067 A1 | 2/2021 | Dahm et al. |
| 2021/0297929 A1* | 9/2021 | Frusina ............... H04L 45/24 |
| 2022/0377522 A1* | 11/2022 | Martin ................ H04W 4/12 |
| 2023/0162307 A1* | 5/2023 | Morris .............. G06Q 50/265 |
| | | 705/325 |

\* cited by examiner

AUTOMATED UPDATING AND DISTRIBUTION OF DIGITAL RECONNAISSANCE MAPS OF AN INCIDENT SCENE

BACKGROUND OF THE INVENTION

Some types of public safety incidents (for example, active shooter situations, chemical spills, search and rescue operations, and the like) require the response of multiple personnel or multiple types of personnel. Personnel may need to explore and assess the incident scene, to secure individual locations and persons, and to remediate damage caused by the incident. Some public safety agencies use portable communications devices (for example, land mobile radios) and video capture devices (for example, body-worn cameras) to facilitate communication between their personnel during an incident response.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
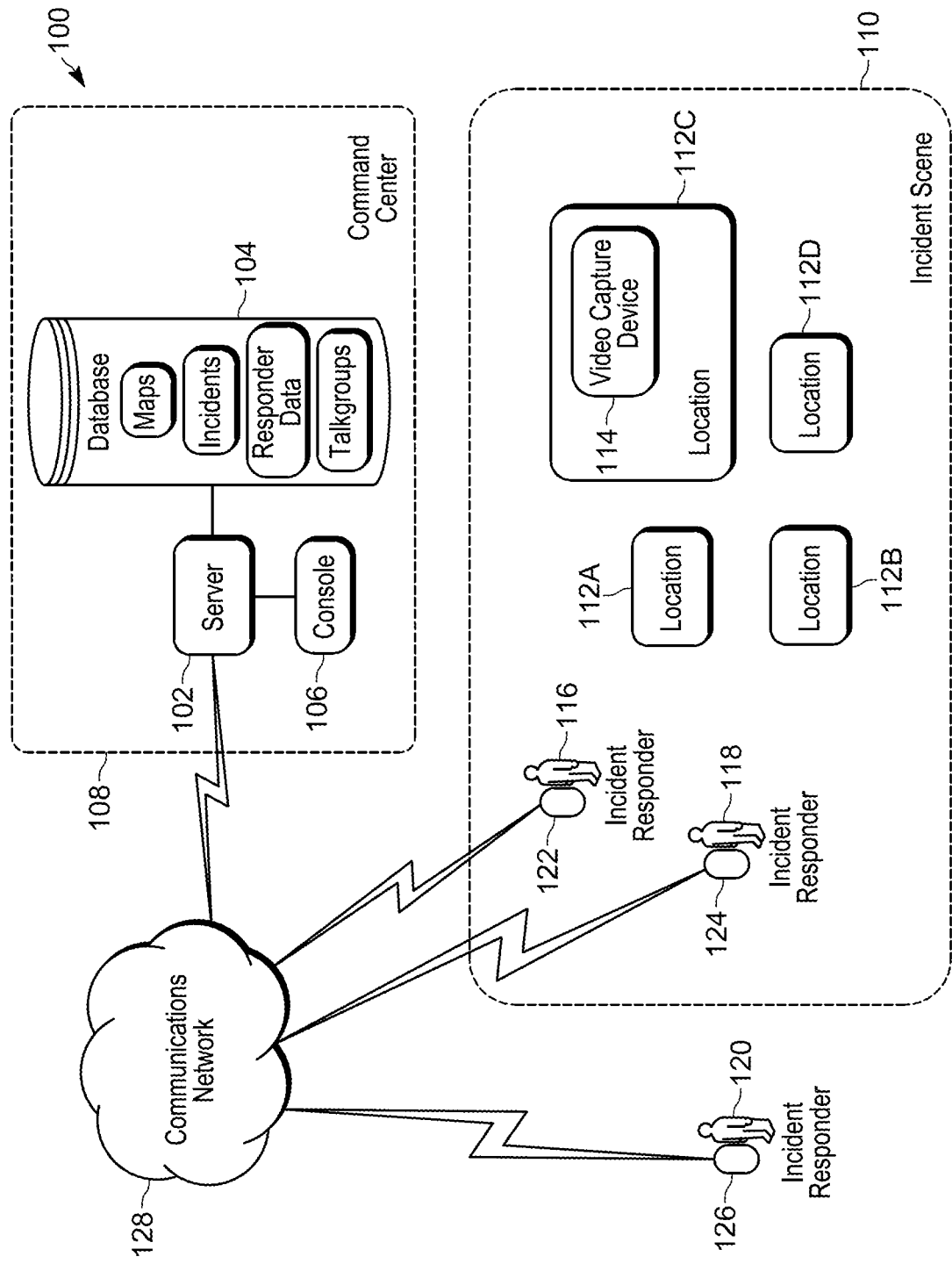
FIG. 1 illustrates a system for dynamically updating and distributing digital reconnaissance maps for an incident response in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

In some instances, the apparatus and method components have been represented where appropriate by conventional symbols in the drawings, showing only those specific details that are pertinent to understanding the of various embodiments and aspects so as not to obscure the disclosure with details that will be readily apparent to those of ordinary skill in the art having the benefit of the description herein.

DETAILED DESCRIPTION OF THE INVENTION

Digital maps are used for many purposes, including responding to public safety incidents. As used herein, the terms "incident" and "public safety incident" refer to situations requiring the response of one or more public safety agencies to enter and secure the incident scene to protect the public. For purposes of the instant application, incidents are described as taking place in an "incident scene," which is made up of multiple "locations." For example, an incident scene may be a building with many rooms (locations). In another example, an incident scene may be an outdoor area, such as park or public square, which may be divided into smaller locations (for example, separated by fences, trees, or other features) or artificially-designated locations (for example, a search grid). In another example, an incident scene may include indoor and outdoor locations (for example, an office building and its adjacent outdoor areas).

Examples of incidents include active shooter situations, other crimes in progress (for example, a bank robbery), searching for a suspect, locating a missing person, responding to a fire, a chemical spill or release, a natural disaster, and the like.

During incident response, incident responders use maps to aid in their investigation and classification of locations at the incident scene as being cleared or in need of further response. However, in some cases, no map is available, or maps may be outdated or incorrect. Static maps do not integrate with electronic information sources and do not convey situational information for the incident response. In addition, during active incidents, or in the aftermath of some types of incidents (for example, hazardous material spills and natural disasters), the situation at the incident scene is often fluid. Criminals, victims, and bystanders may move within and between locations at an incident scene. The situation may improve in some locations and deteriorate in others. Although information regarding the situation at an incident scene is available from electronic voice, data, and video transmissions, such information is not integrated with maps of the incident scene. In addition, some information received about the state of the locations may be lacking, conflicting, or incorrect.

To address, among other things, these technical problems with current mapping technology, systems and methods are provided herein for automatically updating and distributing digital reconnaissance maps of an incident scene.

Among other things, embodiments provided herein utilize artificial intelligence (AI) agents to automatically produce digital reconnaissance maps of an incident scene. Relevant incident responders are automatically placed in a talkgroup based the type of incident and the expertise required to respond to the incident. AI agents analyze voice communications between incident responders in the talkgroup to automatically populate digital reconnaissance maps with indications of location status (for example, whether a location is cleared).

Incident commanders and incident responders are provided with digital reconnaissance maps of the incident scene, which automatically update as locations at the incident scene are assessed by incident responders. Incident commanders and incident responders can quickly determine which locations have been cleared, which locations need to be cleared, and which locations may need to be re-cleared (for example, because too much time has passed since an incident responder investigated that location).

Embodiments and aspects presented herein also analyze video information (provided, for example, by body worn cameras utilized by incident responders) to assess location status and update the reconnaissance maps. By analyzing video information, AI agents can identify missed areas within locations (for example, a closet or obstructed area within a room) that have not been cleared and alert incident commanders or incident responders to check these areas.

Embodiments and aspects presented herein are also capable of determining multiple levels of clearance for locations at an incident scene. For example, a tactical officer may clear a location from a safety standpoint, which indicates to emergency medical technicians that they may enter the location to assess any injured parties that may be present. Upon stabilizing any injured parties, the emergency medical technicians may designate the location as clear. Using such embodiments, incident commanders receive reconnaissance maps with both clearance indications, which, for example, tactical incident responders receive reconnaissance maps containing only safety clearance indications.

Embodiments and aspects presented herein also automatically deploy incident responders as needed to verify locations and clear or re-clear locations. The embodiments provided herein provide accurate, up to date status information on the incident response, which in turn improves the effectiveness and speed of the incident response.

Additionally, using such embodiments, digital reconnaissance maps are produced that include accurate and up to date information about the state of the incident scene. This, in turn, can reduce false negative and positive indications, reducing the misuse of resources, which in turn leads to more efficient use of communications networks and computing resources and improves the response to public safety incidents. Such embodiments also provide more efficient use of communications infrastructure by reducing the time and tasks necessary to respond to incidents and secure an incident scene.

One example embodiment provides a system for dynamically updating and distributing digital reconnaissance maps for an incident response. The system includes a communication interface and an electronic processor coupled to the communication interface. The electronic processor is configured to receive, via the communication interface, an incident notification for an incident occurring at an incident scene. The electronic processor is configured to generate a reconnaissance map for the incident scene. The electronic processor is configured to receive, via the communication interface, a voice communication associated with a first incident responder at the incident scene. The electronic processor is configured to determine, for the first incident responder, a location within the incident scene. The electronic processor is configured to determine a location status for the location based on the voice communication. The electronic processor is configured to generate an updated reconnaissance map for the incident scene based on the reconnaissance map, the location, and the location status. The electronic processor is configured to send, via the communication interface, the updated reconnaissance map to an electronic communication device associated with a second incident responder.

Another example embodiment provides a method for dynamically updating and distributing digital reconnaissance maps for an incident response. The method includes receiving, by an electronic processor, an incident notification for an incident occurring at an incident scene. The method includes generating, with the electronic processor, a reconnaissance map for the incident scene. The method includes determining, for each of a plurality of incident responders at the incident scene, a responder characteristic. The method includes assigning, based on an incident type for the incident and the responder characteristics for the plurality of incident responders, a first subset of incident responders to a first incident talkgroup, the first subset of incident responders including a first incident responder. The method includes receiving, via an electronic communication interface, a voice communication associated with the first incident responder. The method includes determining, for the first incident responder, a location within the incident scene. The method includes determining a location status for the location based on the voice communication. The method includes generating an updated reconnaissance map for the incident scene based on the reconnaissance map, the location, and the location status. The method includes sending, via the electronic communication interface, the updated reconnaissance map to at least one electronic communication device associated with the first incident talkgroup.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 is a diagram of an example system 100, which is configured to, among other things, dynamically update and distribute digital reconnaissance maps for incident response. In the example illustrated, the system 100 includes a server 102, a database 104, and a console 106. As illustrated, the components of the system 100 are part of a command center 108 (for example, a public safety dispatch center or a mobile command center). In other instances, the components of the system 100 may be distributed among multiple locations and communicatively coupled to one another via one or more communications networks.

The system 100 is configured to, among other things, generate, update, and distribute digital reconnaissance maps, which may be used to coordinate incident response at an incident scene (for example, the incident scene 110). An incident scene is the area in which a public safety incident is occurring. An incident scene may include indoor areas, outdoor areas, or both. In addition, an incident may grow or reduce in size as the incident progresses or is resolved. As illustrated, an incident scene may consist of multiple locations 112A-D. Four locations are illustrated only by way of example. It should be noted that the embodiments described herein are applicable to incident scenes with more or fewer locations. In some instances, locations within an incident scene may include or be observable by a video capture device (for example, a surveillance camera) capable of capturing video streams of the location and transmitted such video streams to the server 102.

In response to an incident, one or more public safety or other agencies may deploy incident responders (for example, law enforcement officers, firefighters, emergency medical technicians, and the like) to respond to the incident. FIG. 1 illustrates a first incident responder 116, a second incident responder 118, and a third incident responder 120. The first incident responder 116, second incident responder 118, and third incident responder 120 are equipped with a first electronic communication device 122, a second electronic communication device 124, and a third electronic communication device 126, respectively. The electronic communication devices may be, for example, converged communication devices providing the responders with multi-mode communications, including voice communications using talkgroups. As used herein, the term "talkgroup" refers to a virtual radio channel that is used for communication among a group of incident responders. An incident responder may be assigned to one or more talkgroups. In some cases, the electronic communication devices also include hardware and software for displaying digital reconnaissance maps, as described herein. In some embodiments, some incident responders may carry multiple electronic communications devices, for example, a portable two-way radio for talkgroup-based voice communications and a tablet computing device for displaying the digital reconnaissance maps.

As illustrated in FIG. 1, incident responders may be present in or adjacent to the incident scene. It should also be noted that the embodiments described herein are applicable to incident responses with more or fewer incident responders than illustrated.

The server 102, database 104, console 106, first electronic communication device 122, second electronic communication device 124, and third electronic communication device 126 are communicatively coupled to one another. In the illustrated embodiment, some of the foregoing are coupled via a communications network 128. The communications network 128 is a communications network including wireless connections, wired connections, or combinations of both. The communications network 128 may be implemented using various local and wide area networks, for example, a Bluetooth™ network, a Wi-Fi network), the Internet, a land mobile radio network, a cellular data network, a Long Term Evolution (LTE) network, a 4G network, a 5G network, or combinations or derivatives thereof.

Figure 2:
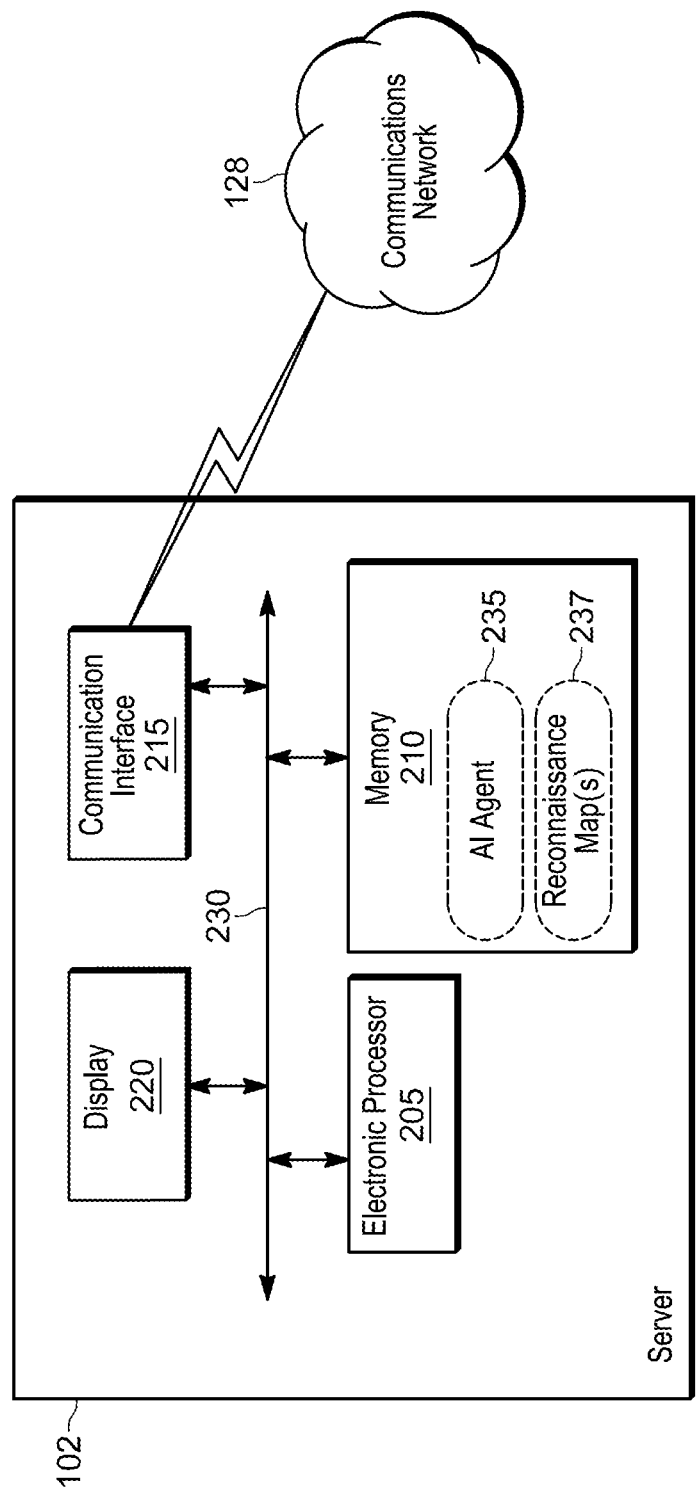
FIG. 2 is a diagram of a server of the system of FIG. 1 in accordance with some embodiments.

As described herein, the server 102 and the database 104 operate to, among other things, generate, update, and distribute digital reconnaissance maps to the incident responders. The server 102 is described more particularly with respect to FIG. 2. In the example provided, the server 102 includes an electronic processor 205, a memory 210, a communication interface 215, and a display 220. The illustrated components, along with other various modules and components (not shown) are coupled to each other by or through one or more control or data buses (for example, a communication bus 330) that enable communication therebetween.

The electronic processor 205 obtains and provides information (for example, from the memory 210 and/or the communication interface 215) and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software to carry out the methods described herein.

The memory 210 can include a program storage area and a data storage area. The program storage area and the data storage area can include combinations of different types of memory, as described herein. In the embodiment illustrated, the memory 210 stores, among other things, an AI agent 235 and one or more reconnaissance maps 237.

The AI agent 235 uses various machine learning methods to analyze data to interact with incident responders and produce digital reconnaissance maps (as described herein). Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using these approaches, a computer program can ingest, parse, and understand data and progressively refine algorithms for data analytics. The AI agent also includes, or is configured to execute, a natural language processing (NLP) engine, which analyzes voice communications received from incident responders to extract keywords relevant to the incident response.

The communication interface 215 is an electronic communication interface configured to receive input and to provide system output. The communication interface 215 obtains information and signals from, and provides information and signals to, (for example, over one or more wired and/or wireless connections) devices both internal and external to the server 102. The communication interface 215 may include a wireless transmitter or transceiver for wirelessly communicating over the communications network 128. Alternatively, or in addition to a wireless transmitter or transceiver, the communication interface 215 may include a port for receiving a cable, such as an Ethernet cable, for communicating over the communications network 128 or a dedicated wired connection. It should be understood that, in some embodiments, the server 102 communicates with other devices through one or more intermediary devices, such as routers, gateways, relays, and the like.

The display 220 is a suitable display such as, for example, a liquid crystal display (LCD) touch screen, or an organic light-emitting diode (OLED) touch screen. In some embodiments, the server 102 implements a graphical user interface (GUI) (for example, generated by the electronic processor 205, from instructions and data stored in the memory 210, and presented on the display 220), that enables a user to interact with the server 102. In some embodiments, the server 102 enables display remotely, for example, using a display (configured similarly to the display 220) of the console 106.

In some embodiments, the server 102 includes a video analytics engine (for example, stored in the memory 210). A video analytics engine analyzes images (for example, images captured by video capture devices at the incident scene 110) to, among other things, identify and detect objects within the images, for example, by implementing one or more object classifiers. In some embodiments, the electronic processor 205 is configured to operate the video analytics engine to detect and analyze incident locations depicted in captured video streams to produce reconnaissance maps of those locations.

Returning to FIG. 1, the server 102 is communicatively coupled to, and writes data to and from, the database 104. In the illustrated embodiment, the database 104 is a database housed on a suitable database server communicatively coupled to and accessible by the server 102. In some instances, the database 104 is part of a cloud-based database system (for example, a data warehouse) external to the system 100 and accessible by the server 102 over one or more wired or wireless networks. In other instances, all or part of the database 104 is locally stored on the server 102.

In some examples, the server 102 and the database 104 are part of a computer-aided dispatch system. As illustrated in FIG. 1, in some instances the database 104 electronically stores map data, incident data, incident responder data, and talkgroup data.

Examples of map data include maps for incident scenes and locations. Map data includes data describing the location and characteristics of a real-world areas (for example, buildings and outdoor spaces). Examples of map data include an area identifier (for example, a unique alphanumeric identifier), a location, a boundary, and information relating to the terrain of the area (for example, topographic data and ground/floor levels for all of or portions of the area). Terrain data may also include data describing objects within the area (for example, the size, shape, and location of the objects, if known). Maps may be sourced or retrieved from building department databases, public or private geographic information systems (GIS), and the like. Map data also includes digital reconnaissance maps as described herein.

Incident data refers to incident records for public safety incidents. An incident record is a data structure within the database 104, which contains information regarding a public safety incident, stored in a particular sequence and format. In some embodiments, the database 104 stores the incident data in a computer aided dispatch (CAD) incident database. The incident data for a given incident includes an incident type (for example, a crime, a fire, a medical emergency, a natural disaster, and the like), an incident identifier (for example, a unique alphanumeric code that identifies the incident record within a computer-aided dispatch system), call identifiers identifying emergency and non-emergency calls received related to the incident, and the like.

Examples of responder data include responder identifiers (for example, a unique alphanumeric identifier assigned to the responder) and responder characteristics. Responder characteristics may include incident response skills (for example, tactical skills, medical skills, firefighting skills, hazardous material handling skills, languages spoken, the ability to operate particular machinery, and the like). Responder characteristics may also include a responder role (for example, identifying a supervisory role or an area of operation overall or within the incident), a security access level, a rank, a talkgroup membership, a responder location, and responder equipment data (for example, model, configuration, and responder assignment information for electronic communications devices or specialized response equipment).

Examples of talkgroup data include data designating talkgroup identifiers, talkgroup assignments designating which incident responders are assigned to which talkgroups, context data for talkgroups (including, for example, rules for talkgroup membership and operation), and over-the-air data (for example, telemetry data for the electronic communication devices participating in the talkgroups).

The above delineation of data types stored in the database 104 is not intended to limit the types and quantity of data that may be stored in the database 104 or otherwise accessible to the server 102.

The console 106 is a computer terminal operated by an operator. In some aspects, the console 106 is a computer-aided dispatch terminal for a public safety organization and is operated by public safety personnel to, for example, access or control functions on the server 102. In other aspects, the console 106 is a computer that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. In one example, the electronic processor is configured to retrieve instructions and data from the memory and execute, for example, functions as described herein. The console 106 sends and receives data over the communications network 128 using the network interface. While the console 106 is described herein with reference to a single operator, in some embodiments, the console 106 includes a plurality of consoles 106 that are each operated by one or more operators.

Figure 3:
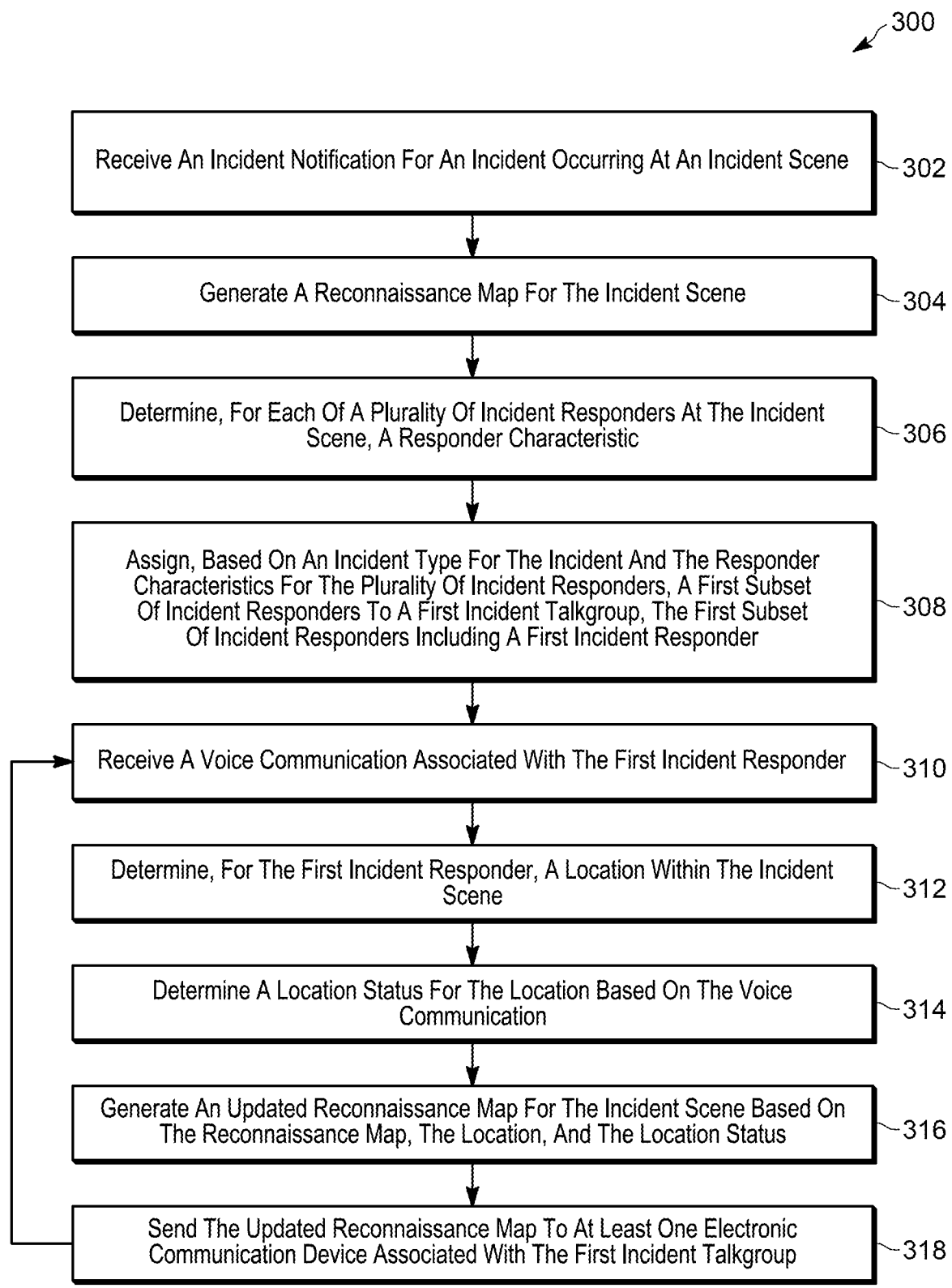
FIG. 3 is a flowchart illustrating a method for dynamically updating and distributing digital reconnaissance maps for an incident response in accordance with some embodiments.

FIG. 3 illustrates an example method 300 for dynamically updating and distributing digital reconnaissance maps for an incident response. Although the method 300 is described in conjunction with the system 100 as described herein, the method 300 could be used with other systems and devices. In addition, the method 300 may be modified or performed differently than the specific example provided.

As an example, the method 300 is described as being performed by the server 102 and, in particular, the electronic processor 205 (executing, among other things, the AI agent 235. However, it should be understood that, in some embodiments, portions of the method 300 may be performed by other devices, including for example, the console 106. Additional electronic processors may also be included in the console 106 and/or server 102 that perform all or a portion of the method 300. For ease of description, the method 300 is described in terms of a single incident and a single talkgroup. However, the method 300 may be applied to multiple incidents, each including multiple talkgroups.

At block 302, the electronic processor 205 receives an incident notification for an incident occurring at an incident scene. For example, the electronic processor 205 may receive an electronic message (for example, a software call) from a computer-aided dispatch system, which includes an incident identifier for the incident.

At block 304, the electronic processor 205 generates a digital reconnaissance map for the incident scene. For example, In some embodiments, the electronic processor 205 retrieves (for example, from the database 104) a pre-stored map for the incident scene. In some instances, little or no information about the incident scene may be available. In such instances, some embodiments may generate a basic reconnaissance map with one starting location, which is built upon (as described herein) as the incident response proceeds. In some embodiments, the electronic processor 205 generates a starting reconnaissance map for the incident scene by analyzing video streams received from one or more image capture devices present at the incident scene (for example, a camera deployed at a mobile command post, one or more body worn cameras, and the like) to generate a three-dimensional model for the portion of the incident scene depicted in the video streams.

Figure 4:
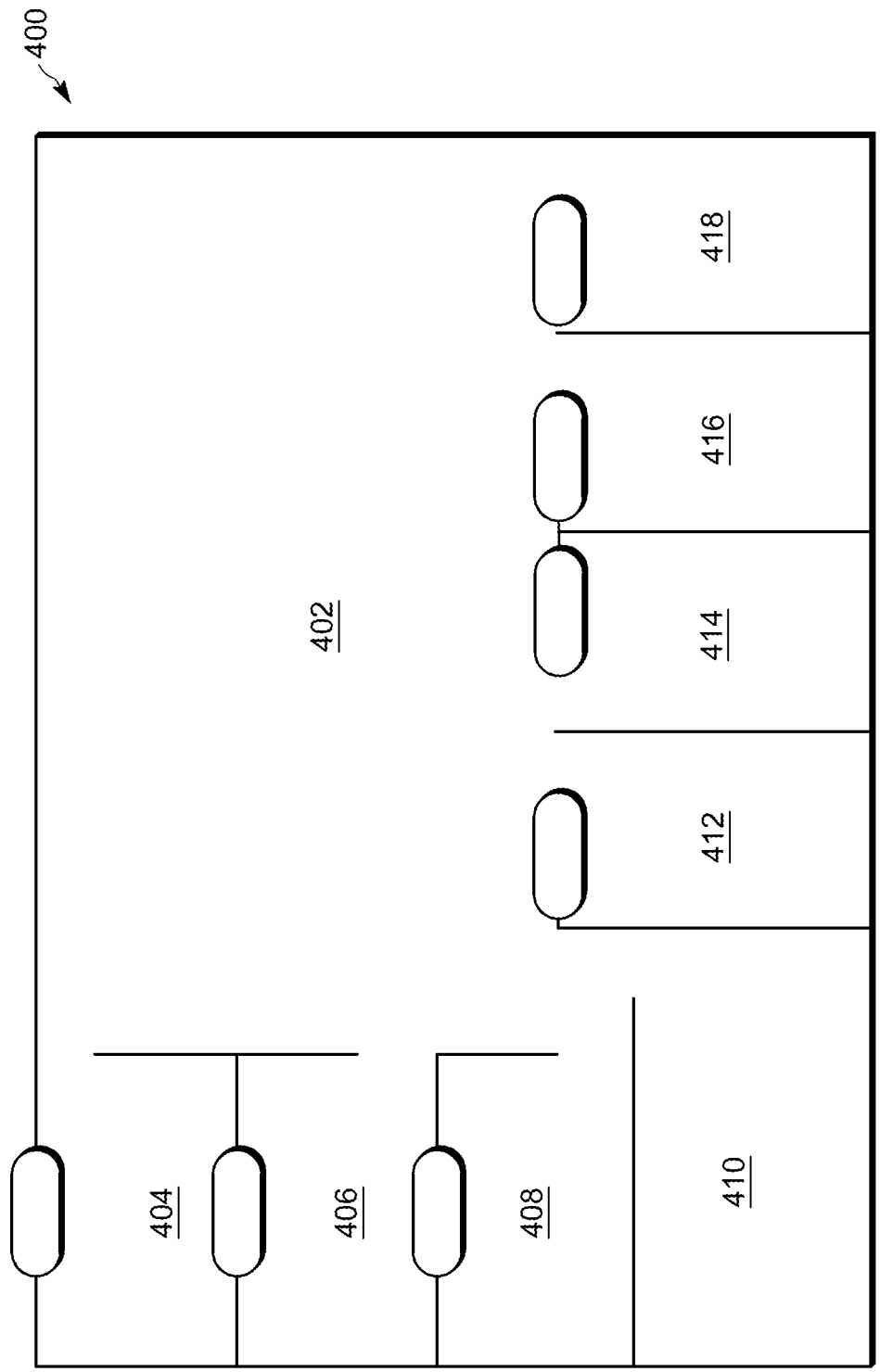
FIG. 4 is a diagram illustrating aspects of the execution of the method of FIG. 3 in accordance with some embodiments.

The digital reconnaissance map is a two or three-dimensional digital map representing the real-world locations comprising the incident scene. A digital reconnaissance map includes or is overlayed with tactical and other information that incident responders may use to plan and perform their duties (for example, indicators of location status as described herein). FIG. 4 illustrates an example reconnaissance map 400, which depicts a portion of an office building. In the example illustrated, each location within the incident scene has been assigned a location identifier 402-418. In some embodiments, the location identifiers are predefined (for example, existing names or room numbers). In some embodiments, the electronic processor 205 assigns the location identifiers automatically when locations are identified (for example, in the initial map or as the incident response proceeds). As illustrated in FIG. 4, the reconnaissance map 400 illustrates boundaries and location identifiers only. In some embodiments, the blank (in the illustrated example, white) backgrounds indicate that the locations have not been checked. In some embodiments, another color, pattern, word, or another suitable graphical indication serves to indicate that the locations have not been checked.

In some embodiments, the reconnaissance map is displayed (for example, on the console 106) and/or shared with incident responders present at or near the incident scene (for example, it is transmitted, via the communications network 128 to electronic communications devices associated with the incident responders.

At block 306, the electronic processor 205 determines, for each of a plurality of incident responders at the incident scene, a responder characteristic. For example, the electronic processor 205 may receive a list of arriving incident responders from a computer-aided dispatch system and retrieve from the database 104, based on the responder identifiers for the incident responders, at least one responder characteristic for each responder. As described herein, responder characteristics may include an incident response skill, a role, a security access level, a rank, and a talkgroup membership for the responder.

At block 308, the electronic processor 205 assigns, based on an incident type for the incident and the responder characteristics for the plurality of incident responders, a first subset of incident responders to a first incident talkgroup. For example, where the incident type indicates a current security threat, such as an active shooter, a bank robbery, or a hostage situation, the first subset of incident responders may be selected based on those responders that have a tactical response (for example, special weapons and tactics (SWAT)) incident response skill. The first subset of incident responders may also be chosen based on their talkgroup membership. For example, members of a tactical response talkgroup might be selected where the incident type indicates a current security threat.

In some instances, the electronic processor 205 controls aspects of the communications network 128 to create the first incident talkgroup as an ad hoc talkgroup. In some instances, the first incident talkgroup is a preexisting talkgroup, which is designated as the first incident talkgroup. For example, where the incident type indicates a current security threat, a tactical response talkgroup may be designated as the incident talkgroup because, for that type of incident, the AI agent determines that members of that talkgroup should be sent in first (for example, to secure the incident scene).

In the example described herein, the first subset of incident responders includes at least a first incident responder.

At block 310, the electronic processor 205 receives a voice communication associated with the first incident responder. For example, the electronic processor 205 may receive, via the communication interface 215, a voice transmission from an electronic communications device associated with the first incident responder. In some instances, the electronic processor 205 receives all copies of all voice communications sent to, from, and between members of the first incident talkgroup.

At block 312, the electronic processor 205 determines, for the first incident responder, a location within the incident scene. In one example, the electronic processor 205 receives and analyzes geolocation information from an electronic communication device associated with the first incident responder. In another example, the electronic processor 205 uses natural language processing to determine the location based on voice transmissions from the first incident responder. For example, the first incident responder may transmit "I am in the lobby of the building" or another similar phrase indicating the location of the first incident responder. In another example, the electronic processor 205 may perform video analysis of a video stream (for example, received from a stationary camera with a view of the location of the first incident responder or a body-worn camera associated with the first incident responder) to determine the location.

At block 314, the electronic processor 205 determines a location status for the location based on the voice communication. As indicated above, the initial location status for the location is "not cleared." As used herein, the terms "clear" or "cleared" refer to a generally positive assessment of a location at an incident scene. A location that has been assessed and designated as clear (has been cleared) is considered free from hazards (for example, there are no attackers, hazardous materials, fire, or other harmful situations present). A location may also be designated as cleared when a situation has been contained or no further response is necessary. For example, while there may be injured parties present, sufficient medical care is being rendered. In another example, while there may be a hazardous situation present (for example, a live electrical wire), the location has been cleared of people and secured such that no other people may enter the location.

Other possible statuses include "in progress" (the location is under assessment), "initially cleared" (the location was cleared by a single incident responder), and "cleared and verified" (the location was cleared by more than one incident responder). In some embodiments, the electronic processor 205 determines the location status for the location based on the voice communication by analyzing the voice communication using natural language processing to extract keywords associated with the incident response. For example, the electronic processor 205 may extract the keywords "Checking room" and determine a location status of "in progress." In another example, the electronic processor 205 may extract the keywords "clear," "all clear," or "secured" and determine a location status of "initially cleared." As described herein, in some embodiments, the location status may be determined based on analysis of a video feed for the location.

Figure 5:
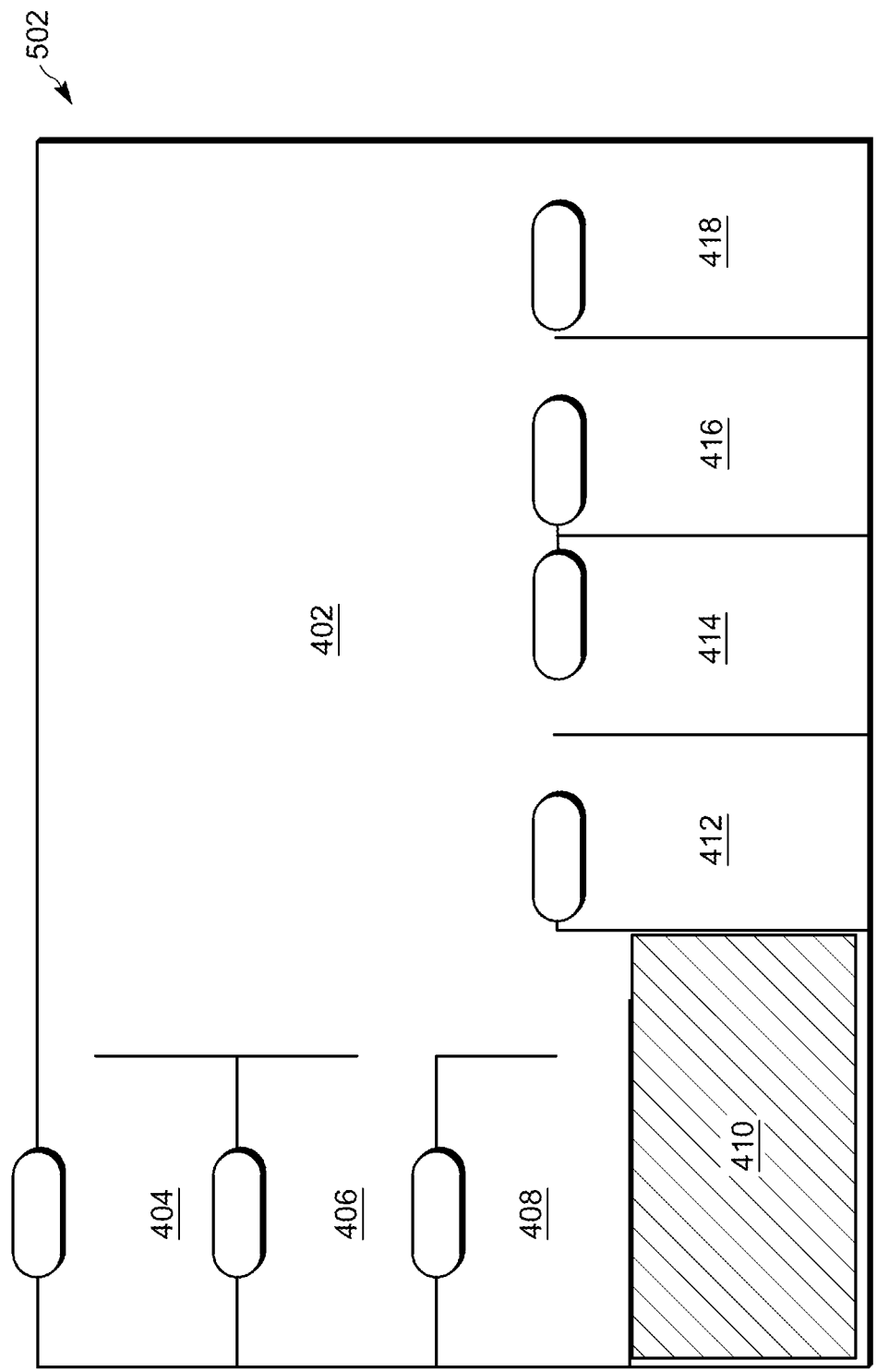
FIG. 5 is a diagram illustrating aspects of the execution of the method of FIG. 3 in accordance with some embodiments.

At block 316, the electronic processor 205 generates an updated reconnaissance map for the incident scene based on the reconnaissance map, the location, and the location status. FIG. 5 illustrates an example updated reconnaissance map 500. In the example illustrated, the location 410 has been highlighted with a graphical representation 502, which indicted the location status. The graphical representations of the location status may include text, colors, shading, graphical patterns, levels of opacity, and the like. In some embodiments, the graphical representation 502 is an animation, which may blink, pulse, alternate colors, or otherwise periodically change its appearance to represent characteristics or other data associated with the location status.

At block 318, the electronic processor 205, sends (for example, via the communication interface 215), the updated reconnaissance map to at least one electronic communication device associated with the first incident talkgroup. In some embodiments, the updated reconnaissance map is broadcast to all members of the first incident talkgroup.

As illustrated in FIG. 3, in some instances, the electronic processor continues analyzing voice communications and updating the reconnaissance map accordingly (at blocks 310-318) until, for example, the incident response is concluded.

In some instances, a combination of video and voice communication analysis is used to determine location status and update the reconnaissance map. In one example, illustrated in FIG. 6, an incident responder is wearing a body worn camera and clearing location. As illustrated in the map 600, the first incident responder 116 has entered a location 650. The electronic processor 205 analyzes the video feed from the body worn camera and determines, based on the location layout that a portion of the location is clear, while remaining portions (blocked from view by a wall 601) are not, and updates and transmits the reconnaissance map accordingly. As illustrated in the map 602, the first incident responder 116 has proceed further into the location 650 and has a view behind the wall 601. The electronic processor 205 updates and transmits the reconnaissance map accordingly. As illustrated in the map 604, the first incident responder 116 is exiting the location 650 and transmits a voice communication indicating that the room is clear. The electronic processor 205, using natural language processing, interprets the voice communication. In the example illustrated, because both automated video analysis and an incident responder report indicate that the room has been cleared the reconnaissance map 604 indicates the locations status of "cleared and verified" using a different pattern than was used to indicate a clear (or partially clear) location on maps 600 and 602.

In some instances, the AI agent determines a confidence level for the location status. The confidence level indicates the confidence in the determination of the location status. For example, a confidence level may be set to low, medium, or high. In some embodiments, a location's confidence level may be set to low when the AI agent uses a video feed to assess a location, set to medium when only one incident responder has assessed the location, and set to high where both the AI agent and an incident responder have assessed a location or where two incident responders have assessed a location.

In some instances, responsive to determining whether a video capture device is present at the location, the electronic processor 205 updates the confidence level for the location status based on the determination. For example, where a video capture device is present at the location, the electronic processor 205 may analyze the video from the video capture device to increase the confidence level for the location status.

In such instances, the electronic processor 205 generates a second updated reconnaissance map for the incident scene based on the confidence level. For example, the graphical representation for the location status may change to indicate the new confidence level. In another example, a text-based indication or a second graphical representation of the confidence level may be overlaid onto the first graphical representation to indicate the new confidence level.

The electronic processor 205 transmits the second updated reconnaissance map to the electronic communication devices participating in the first incident talkgroup.

In some examples, the electronic processor 205 updates the confidence level for a location status based on the expiration of a time period. For example, where a predetermined time period (for example, 10 minutes) has passed since the location has been assessed, the confidence level may be downgraded. In such embodiments, the electronic processor 205 updates the reconnaissance map based on the updated confidence level and transmits the updated reconnaissance map to the electronic communication devices participating in the first incident talkgroup.

In some examples, video analysis is used to determine how complete the location status is. In such examples, the electronic processor 205, responsive to determining that a video capture device is present at the location, receives a video stream including images of the location from the video capture device. The electronic processor 205 analyzes the video stream to determine a completion level for the location status. In the example illustrated in FIG. 6, the electronic processor 205 determines that the location 650 is 60% cleared in map 600 and 80% cleared in map 602. The electronic processor 205 generates an updated reconnaissance map for the incident scene based on the completion level (for example, by overlaying text indicating the completion level onto the graphical representation of the location status) and transmits the updated reconnaissance map to the electronic communication devices participating in the first incident talkgroup.

In some examples, the AI agent requests that a location status be verified. In one aspect, the AI agent sends a voice communication to an incident responder asking the responder to verify a location status for a particular location. In another example, the reconnaissance maps displayed for the incident responders may indicate graphically which locations require verification.

In some instances, the AI agent sends a request to verify a location status where a video capture device is not present at the location. In one example, the AI agent sends a request to verify a location status based on a geographic complexity of the location. For example, where a location includes a lot of visual obstacles, furniture, or other features that might obscure an incident responder's view or provide cover for bad actors (for example, as detected using video analysis and object recognition techniques), the AI agent may request verification for the location more frequently. In some instances, the AI agent sends a request to verify a location status based on the size of the location. In some examples, the AI agent sends a request to verify a location status based on the expiration of a time period. In yet other example, the AI agent sends a request to verify a location status based on the confidence level for the location status. Verification of a location status may also include, the AI agent sending a request to verify a location status based on a completion level for the location status, sending a request to verify a location status based on an incident severity level, sending a request to verify a location status based on an incident response skill level for the first incident responder, or some combination of the techniques described in this paragraph.

As noted, in some cases, no map is available, or maps may be outdated or incorrect. Accordingly, in some instances, the AI agent uses video analysis of the location to verify and/or update the reconnaissance map. In such examples, the electronic processor receives, from a video capture device, a video stream including images of the location and analyzes the video stream to generate a three-dimensional model of the location. The electronic processor 205 compares the three-dimensional model to a representation of the location in the reconnaissance map, generates an updated reconnaissance map based on the comparison, and transmits the updated reconnaissance map to the electronic communication devices participating in the first incident talkgroup.

Figure 6:
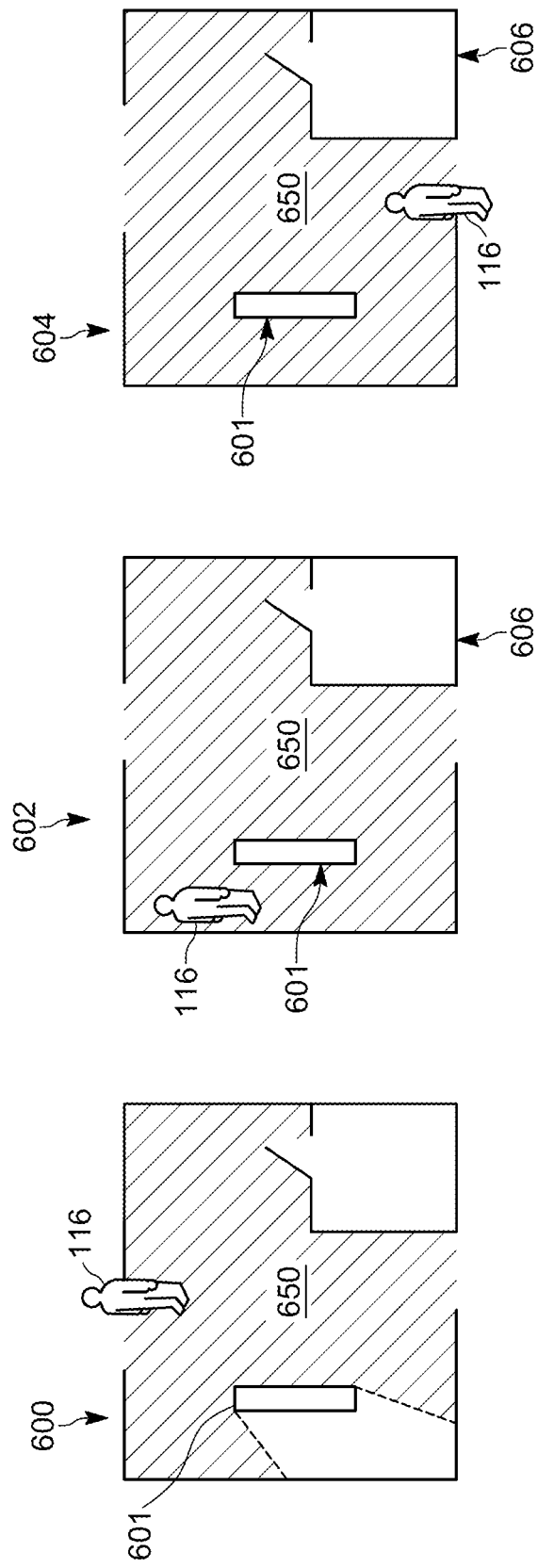
FIG. 6 is a diagram illustrating aspects of the execution of the method of FIG. 3 in accordance with some embodiments.

In some instances, the electronic processor 205 receives, from a video capture device, a video stream including images of the location, and analyzes the video stream to determine at least one unverified area for the location. For example, as illustrated in FIG. 6, reconnaissance maps 602 and 604 include an unverified area 606 (for example, a closet). Upon determining this unverified area, the electronic processor sends (for example, via the communication interface 215) to an electronic communication device associated with an incident responder, a request to investigate the unverified area.

In the examples described above, a single reconnaissance map is updated and distributed. However, in other examples, multiple types of updated reconnaissance maps may be generated. For example, in some incidents, there are multiple groups of responders, such as, for example, tactical response personnel and medical response personnel. In another example, such as a natural disaster, the incident response may include medical responders and damage remediation responders (such as field engineers, utility personnel, and the like). In some instances, the AI agent generates a master reconnaissance map, which shows location statuses determined by all responding groups. The AI agent also generates individual reconnaissance maps that are group specific. For example, in a master reconnaissance map a location may have a location status of not clear if tactical has not cleared it and then a location status as "safe but not cleared for medical" until medical responders determine that there are no injured parties or that all injured parties are attended to, and the location is declared clear from medical standpoint. In another example, tactical responders could report a location status of clear but indicate persons in need of medical assistance, which may result in one status for the location on a medical responders' reconnaissance map and another status for the same location on a tactical responders' reconnaissance map.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for automatically updating and distributing digital reconnaissance maps for incident response, the system comprising:
an electronic communication interface;
an electronic processor coupled to the communication interface and configured to:
receive, via the electronic communication interface, an incident notification including an incident identifier identifying an incident record for an incident occurring at an incident scene;
responsive to receiving the incident notification, generate a reconnaissance map for the incident scene;
determine, for a first incident responder, a location within the incident scene;
receive, from a video capture device, a video stream including images of the location;
analyze the video stream to generate a three-dimensional model of the location;
compare the three-dimensional model to a representation of the location in the reconnaissance map;
generate an updated reconnaissance map based on the comparison; and
send, via the electronic communication interface, the updated reconnaissance map to an electronic communication device associated with a second incident responder.

2. The system of claim 1 wherein the electronic processor is further configured to:
analyze the video stream to determine at least one unverified area for the location; and
send, via the electronic communication interface to the electronic communication device associated with the second incident responder, a request to investigate the at least one unverified area.

3. The system of claim 1, wherein the electronic processor is configured to:
receive, via the electronic communication interface, a voice communication associated with the first incident responder;
determine a location status for the location based on the voice communication by analyzing the voice communication using natural language processing to extract keywords associated with the incident response; and
generate the updated reconnaissance map for the incident scene based on the location status.

4. The system of claim 1, wherein the electronic processor is configured to generate the reconnaissance map for the incident scene by retrieving, from an electronic database communicatively coupled to the electronic processor, a pre-stored map for the incident scene.

5. The system of claim 1, wherein the electronic processor is configured to generate the reconnaissance map for the incident scene by analyzing a video stream received from a camera present at the incident scene to generate a three-dimensional model for a portion of the incident scene depicted in the video stream.

6. The system of claim 1, wherein the electronic processor is further configured to:
determine, for each of a plurality of incident responders, a responder characteristic; and assign, based on an incident type for the incident and the responder characteristics for the plurality of incident responders, a first subset of incident responders to a first incident talkgroup;
wherein the first incident responder and the second incident responder are included in the first subset of incident responders.

7. The system of claim 6, wherein the responder characteristic is one selected from the group consisting of an incident response skill, a role, a security access level, a rank, and a talkgroup membership.

8. The system of claim 6, wherein the electronic processor is configured to generate the updated reconnaissance map based on the responder characteristics for the first subset of incident responders.

9. The system of claim 1, wherein the electronic processor is further configured to:
responsive to determining whether a video capture device is present at the location, update a confidence level for the location status based on the determination;
generate a second updated reconnaissance map for the incident scene based on the confidence level; and
send, via the electronic communication interface, the second updated reconnaissance map to the electronic communication device associated with the second incident responder.

10. The system of claim 1, wherein the electronic processor is further configured to:
analyze the video stream to determine a completion level for the location status; and
generate the second updated reconnaissance map for the incident scene based on the completion level.

11. The system of claim 1 wherein the electronic processor is further configured to send, via the electronic communication interface to the electronic communication device associated with the second incident responder, a request to verify the location status.

12. The system of claim 11 wherein the electronic processor is further configured to send the request to verify the location status responsive to at least one selected from the group consisting of determining that a video capture device is not present at the location, a geographic complexity of the location, a size of the location, the expiration of a time period, a confidence level for the location status, a completion level for the location status, an incident severity level, and an incident response skill level for the first incident responder.

13. The system of claim 1, wherein the electronic processor is further configured to:
update a confidence level for the location status based on the expiration of a time period;
generate a second updated reconnaissance map for the incident scene based on the updated confidence level; and
send, via the electronic communication interface, the second updated reconnaissance map to the electronic communication device associated with the second incident responder.

14. A method for automatically updating and distributing digital reconnaissance maps for incident response, the method comprising:
receiving, by an electronic processor, an incident notification including an incident identifier identifying an incident record for an incident occurring at an incident scene;

responsive to receiving the incident notification, generating, with the electronic processor, a reconnaissance map for the incident scene;

determining, for each of a plurality of incident responders at the incident scene, a responder characteristic;

assigning, based on an incident type for the incident and the responder characteristics for the plurality of incident responders, a first subset of incident responders to a first incident talkgroup, the first subset of incident responders including a first incident responder;

determining, for the first incident responder, a location within the incident scene;

receiving, from a video capture device, a video stream including images of the location;

analyzing the video stream to generate a three-dimensional model of the location;

comparing the three-dimensional model to a representation of the location in the reconnaissance map;

generating an updated reconnaissance map based on the comparison; and sending, via the communication interface, the updated reconnaissance map to the at least one electronic communication device associated with the first incident talkgroup.

15. The method of claim 14, further comprising:

analyzing the video stream to determine at least one unverified area for the location; and sending, via the communication interface to an electronic communication device associated with a second incident responder included in the first subset of incident responders, a request to investigate the at least one unverified area.

16. The method of claim 14, further comprising:

responsive to determining whether a video capture device is present at the location, updating a confidence level for the location status based on the determination;

generating a second updated reconnaissance map for the incident scene based on the confidence level; and sending, via the communication interface, the second updated reconnaissance map to the at least one electronic communication device associated with the first incident talkgroup.

17. The method of claim 14, further comprising:

responsive to determining that a video capture device is present at the location, receiving a video stream including images of the location from the video capture device;

analyzing the video stream to determine a completion level for the location status; and generating a second updated reconnaissance map for the incident scene based on the completion level.

18. The method of claim 14, further comprising:

sending, via the communication interface to an electronic communication device associated with a second incident responder included in the first subset of incident responders, a request to verify the location status.

19. The method of claim 14, further comprising:

receiving, via the electronic communication interface, a voice communication associated with the first incident responder;

determining a location status for the location based on the voice communication by analyzing the voice communication using natural language processing to extract keywords associated with the incident response; and generating the updated reconnaissance map for the incident scene based on the location status.

* * * * *